United States Patent
Neugärtner

(10) Patent No.: US 9,644,933 B2
(45) Date of Patent: May 9, 2017

(54) FOLDING RULE AND METHOD FOR MEASURING ANGLES

(71) Applicant: Mario Neugärtner, Eckstedt (DE)

(72) Inventor: Mario Neugärtner, Eckstedt (DE)

(*) Notice: Subject to any disclaimer, the term of this patent is extended or adjusted under 35 U.S.C. 154(b) by 145 days.

(21) Appl. No.: 14/765,361

(22) PCT Filed: Feb. 4, 2014

(86) PCT No.: PCT/EP2014/052155
§ 371 (c)(1),
(2) Date: Aug. 3, 2015

(87) PCT Pub. No.: WO2014/122130
PCT Pub. Date: Aug. 14, 2014

(65) Prior Publication Data
US 2016/0025475 A1 Jan. 28, 2016

(30) Foreign Application Priority Data
Feb. 5, 2013 (DE) .................. 10 2013 201 877

(51) Int. Cl.
*G01B 3/06* (2006.01)
*G01B 3/56* (2006.01)

(52) U.S. Cl.
CPC *G01B 3/06* (2013.01); *G01B 3/56* (2013.01)

(58) Field of Classification Search
CPC ................... G01B 3/06; G01B 3/56
(Continued)

(56) References Cited

U.S. PATENT DOCUMENTS 4,955,141 A * 9/1990 Welch .............. G01B 3/56
33/418
6,237,238 B1 * 5/2001 Shapiro .............. B43L 7/10
33/471
(Continued)

FOREIGN PATENT DOCUMENTS

CH   431108 A   2/1967
CH   439768 A   7/1967
(Continued)

OTHER PUBLICATIONS

International Search Report for PCT/EP2014/052155, ISA/EP, Rijswijk, NL, mailed Apr. 24, 2014.

*Primary Examiner* — G. Bradley Bennett
(74) *Attorney, Agent, or Firm* — Harness, Dickey & Pierce, P.L.C.

(57) ABSTRACT

The invention relates to a folding rule (G) which comprises at least four sections (1, 2, 3, 4) that are hinged together, at least the fourth section (4) having two scales (SK1, SK2) for angle measurement and the first section (1) having at least one reading mark (M). The first scale (SK1) for angle measurement and the reading mark (M) are located on the respective section (4, 1) such that the reading mark (M) points to the value of the first scale (SK1), which corresponds to the angle (α) to be measured between the sides (O1, O2) that rest on the second section (2) or on the fourth section (4) when the first section (1) and the fourth section (4) are aligned in parallel and a first lateral edge (1.1) or a second lateral edge (1.2) of the first section (1) rests on a first lateral edge (4.1) of the fourth section (4). The second scale (SK2) for angle measurement and the reading mark (M) are located on the respective section (4, 1) such that the reading mark (M) points to the value of the second scale (SK2), which corresponds to the angle (α) to be measured between the sides (O1, O2) that rest on the third section (3) or on the fourth section (4) when the first section (1) and the fourth section (4) are aligned in parallel and a second lateral edge (Continued)

Figure 1:
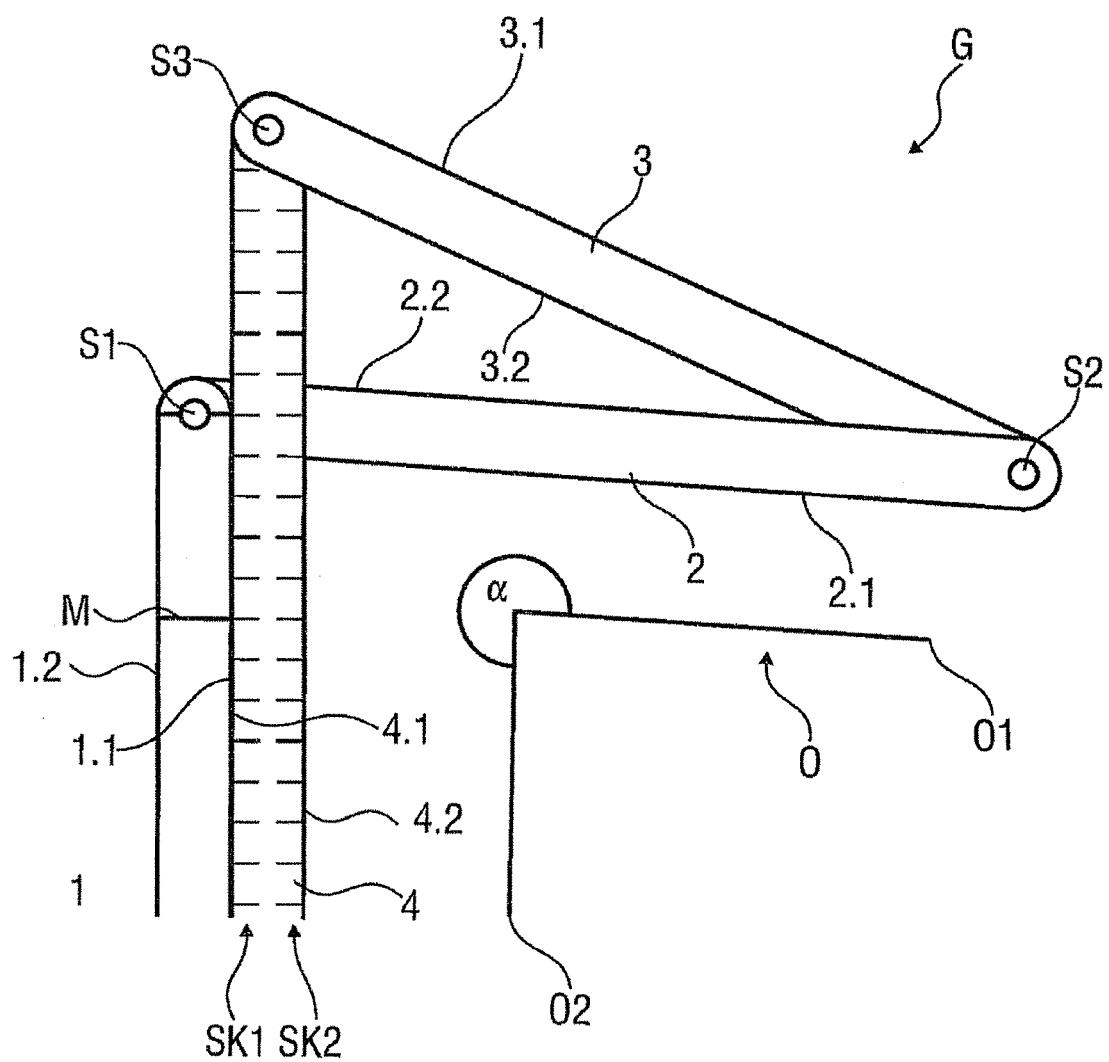

(1.2) of the first section (1) rests on a second lateral edge (4.2) of the fourth section (4). The invention further relates to a method for angle measurement by means of the folding rule (G).

9 Claims, 4 Drawing Sheets

(58) Field of Classification Search
USPC .................. 33/1 N, 452, 456, 458, 478, 534
See application file for complete search history.

(56) References Cited

U.S. PATENT DOCUMENTS

| | | | |
|---|---|---|---|
| 7,774,947 B1* | 8/2010 | Russo | B23D 47/02 |
| | | | 33/455 |
| 9,329,012 B2* | 5/2016 | Neugaertner | G01B 3/06 |
| 2007/0220766 A1* | 9/2007 | Cooke | B25H 7/00 |
| | | | 33/456 |
| 2007/0227022 A1* | 10/2007 | Bruce | B43L 7/10 |
| | | | 33/455 |
| 2009/0193670 A1* | 8/2009 | Fernandes | B25H 7/00 |
| | | | 33/27.03 |
| 2013/0283626 A1 | 10/2013 | Jones | |
| 2014/0090261 A1* | 4/2014 | Jones | G01B 3/56 |
| | | | 33/418 |
| 2015/0101206 A1* | 4/2015 | Smith | G01B 3/563 |
| | | | 33/534 |
| 2016/0363429 A1* | 12/2016 | Clerc | G01B 3/56 |

FOREIGN PATENT DOCUMENTS

| | | |
|---|---|---|
| DE | 1622370 | 4/1951 |
| DE | 834903 C | 3/1952 |
| WO | WO-2012/044180 A1 | 4/2012 |

* cited by examiner

FOLDING RULE AND METHOD FOR MEASURING ANGLES

The invention relates to a folding rule according to the features of the preamble of claim 1 and to a method for measuring angles according to the features of the preamble of claim 9.

Folding rules for measuring length measurements are known in general from the prior art. Furthermore, protractors are known in general.

CH 439 768 A describes a foldable measuring tool which is realized as a multi-purpose measuring instrument. One end leg of two outer folding legs, which serve for adjusting an angle, is adjustable to every desired angle by way of a scale with one end on the scale of a third and fourth leg which are connected to a second leg and form a triangle with the two outer legs. In addition, further scales, which provide values determined by a certain arithmetic or mathematical operation corresponding to measuring variables determined by way of the measuring instrument, are associated with the measuring instrument scales.

DE 834 903 C describes a folding rule with means for measuring angles, wherein from a third and fourth section at least the fourth section has on its top edge a graduation which, in cooperation with a corner on the free end of a first section, provides a size of an angle set between the first two sections when the first two sections are folded over the third and fourth sections which are located in the stretched state.

The object underlying the invention is to provide a folding rule which is improved compared to the prior art and a method for measuring angles which is improved compared to the prior art.

The object is achieved according to the invention by a folding rule with the features of claim 1 and a method for measuring angles with the features of claim 9.

Advantageous developments of the invention are the object of the sub-claims.

A folding rule includes at least four sections which are fastened to one another so as to be pivotable, wherein at least the fourth section comprises two scales for measuring angles and the first section comprises at least one reading mark.

In this case, the first scale for measuring angles and the reading mark are arranged in such a manner on the respective section that the reading mark points to the value of the first scale which corresponds to the angle to be measured between the sides which abut against the second section or against the fourth section, more precisely against a first lateral edge of the second section or of the fourth section, when the first section and the fourth section are aligned parallel to one another and a first lateral edge or a second lateral edge of the first section abuts against a first lateral edge of the fourth section. In an expedient manner, the second scale for measuring angles and the reading mark are arranged in such a manner on the respective section that the reading mark points to the value of the second scale which corresponds to the angle to be measured between the sides which abut against the third section or against the fourth section, more precisely against a first lateral edge of the third section or of the fourth section, when the first section and the fourth section are aligned parallel to one another and a second lateral edge of the first section abuts against a second lateral edge of the fourth section.

The sides of the angle to be measured abutting against the second section or against the fourth section means that one of the sides of the angle abuts against the second section and the other side abuts against the fourth section.

The sides of the angle to be measured abutting against the third section or against the fourth section means that one of the sides of the angle abuts against the third section and the other side abuts against the fourth section.

In a method according to the invention for measuring angles by means of such a folding rule, the first section and the fourth section of the folding rule are aligned parallel to one another, wherein the first lateral edge or the second lateral edge of the first section is placed against a first lateral edge of the fourth section, wherein the first lateral edge of the second section and the second lateral edge of the fourth section are each placed against a side of the angle to be measured and wherein an angle value is read off at least on the fourth section at the position of the first scale for measuring angles to which a reading mark on the first section points. As an alternative to this, the first section and the fourth section of the folding rule are aligned parallel to one another and are placed side by side with second lateral edges, wherein first lateral edges of the third section and of the fourth section are each placed against a side of the angle to be measured and wherein an angle value is read off at least on the fourth section at the position of a second scale for measuring angles to which the reading mark on the first section points.

The folding rule according to the invention and the method according to the invention make it possible to measure angles such that no additional measuring instrument, for example in the form of a separate protractor, is necessary for this type of angle measuring. This is advantageous, for example, for craftsmen as they usually have to have a folding rule with them and, by means of the folding rule according to the invention, are able to carry out not only the usual length measurements but also angle measurements. Carrying a separate angle measuring device can be avoided in this manner.

The first variant of the method according to the invention, where the first section and the fourth section of the folding rule are aligned parallel to one another, wherein the first lateral edge or the second lateral edge of the first section is placed against the first lateral edge of the fourth section, wherein the first lateral edge of the second section and the second lateral edge of the fourth section are each placed against a side of the angle to be measured and wherein an angle value is read off at least on the fourth section at the position of a first scale for measuring angles to which a reading mark on the first section points, enables the reading of reflex angles, also called over-obtuse angles. For example, in this way angles of objects can be measured by placing the folding rule in the described manner against the outer sides of the respective object, for example against the outer sides of adjoining outside walls of a building which are aligned at a corresponding angle in relation to one another. If the inner sides of the object, for example of the building, are aligned parallel to the outer sides, in this way it is also possible to measure the corresponding angle in the object or building which is possibly inaccessible to the folding rule. The value of said inside angle is calculated by forming the difference from 360° and from the angle value determined on the outside in the described manner.

The second variant of the method, where the first section and the fourth section of the folding rule are aligned parallel to one another and are placed side by side with second lateral edges, wherein first lateral edges of the third section and of the fourth section are each placed against a side of the angle to be measured and wherein an angle value is read off at least on the fourth section at the position of the second scale for measuring angles to which the reading mark on the first section points, enables the measuring of acute angles, right angles and obtuse angles. For example, in this way angles of objects can be measured by placing the folding rule in the described manner against the inner sides of the respective object, for example against the inner sides of adjoining walls of a building which are aligned at a corresponding angle in relation to one another. If the outer sides of the object, for example of the building, are aligned parallel to the inner sides, in this way it is also possible to measure the corresponding angle on the outer sides of the object which is possibly inaccessible to the folding rule. The value of said outside angle is calculated by forming the difference from 360° and from the angle value determined on the inside in the described manner.

In both cases, the respective scale, i.e. for the first variant the first scale and for the second variant the second scale, can also comprise both angle values in an advantageous embodiment such that the subtracting does not have to be carried out but the measured angle value and the angle value resulting from the subtraction are able to be read off the scale. As an alternative to this, the first scale and/or the second scale can also only comprise the angle value resulting from the subtraction such that said angle value does not have to be calculated but can be directly read off the scale. In this case, the respective other angle value actually measured in the above-described manner would have to be calculated, where required, by a corresponding recalculation.

In one embodiment of the folding rule, the folding rule can also comprise, for example, just the first scale or just the second scale. In said case, however, just the first variant or just the second variant of the method could then be carried out in a corresponding manner. Consequently, the embodiment in which the folding rule comprises the two scales is clearly more advantageous as, in this way, there is a larger number of possible applications.

In one possible development, the two scales are continued at least onto at a fifth section of the folding rule, in a preferred manner also onto a sixth section of the folding rule. In this way, angle measuring is enabled over a very large angle value range. If the angle to be measured should then comprise an angle value where it is not possible to place the first section against the fourth section of the folding rule, in the above-described method, in place of the fourth section, depending on the respective angle value of the angle to be measured, either the fifth section or the sixth section of the folding rule is used, wherein then if the fifth section is used in place of the fourth section, the sections of the folding rule are pivoted in such a manner that the fourth and the fifth section are aligned in a line one behind another, and if the sixth section is used in place of the fourth section, the sections of the folding rule are pivoted in such a manner that the fourth, the fifth and the sixth section are aligned in a line one behind another. The fourth and the fifth section or the fourth, fifth and sixth sections then interact as one elongated fourth section.

In a further possible development, the first scale is arranged in the region of the first lateral edge of at least the fourth section and the second scale is arranged in the region of the second lateral edge of at least the fourth section. In this way, reading off the respective angle value is made easier as the read marking always abuts directly against the scale used in the respective method variant.

A spacing between a second pivot axis, by means of which the second section and the third section are fastened to one another so as to be pivotable, and an edge of the end face of the third section nearest the second pivot axis is, in particular, no larger than the smallest spacing between the second pivot axis and a first lateral edge of the second section and/or a spacing between the second pivot axis and an edge of the end face of the second section nearest the second pivot axis is preferably no larger than the smallest spacing between the second pivot axis and a first lateral edge of the third section. In this way, it is ensured that the placing of the first lateral edge of the third section against the respective side of the angle to be measured is not obstructed by a protrusion of the second section or it is ensured that the placing of the first lateral edge of the second section against the respective side of the angle to be measured is not obstructed by a protrusion of the third section. Measuring errors are prevented as a result.

In a possible development a spacing between a third pivot axis, by means of which the third section and the fourth section are fastened to one another so as to be pivotable, and an edge of the end face of the third section nearest the third pivot axis and an edge of the end face of the fourth section nearest the third pivot axis is the same size as and no larger than the smallest value of the spacing between the third pivot axis and a first lateral edge of the third section and a first lateral edge of the fourth section. As a result, it is ensured that the placing of the first lateral edge of the third section and of the fourth section against the respective side of the angle to be measured is not obstructed by a protrusion of the fourth section or of the third section. Measuring errors are avoided in this way.

According to a further development, the at least one reading mark extends over an entire width of the first section. As a result, reliable reading from the scales and reliable assignment of the read marking to a respective value on the respective scale are ensured, both in the first and in the second variant of the method.

In a further development, the folding rule is realized from wood, plastics materials and/or metal. This enables a sturdy, wear-resistant folding rule G to be produced in a simple, cost-efficient manner.

In a further possible development, the folding rule comprises at least one length measuring scale on the sections. This enables the dual function of the folding rule according to the invention such that it can be used both for measuring angles and for measuring lengths.

According to a further development, the length measuring scale is arranged on a flat side of the folding rule remote from the scales for measuring angles. As a result, the two functions of the folding rule are separated from one another such that a risk of confusion is avoided and simple, reliable reading of the respective length or angle value and, as a result, reliable length determining when measuring lengths and reliable angle determining when measuring angles are made possible.

Figure 2:
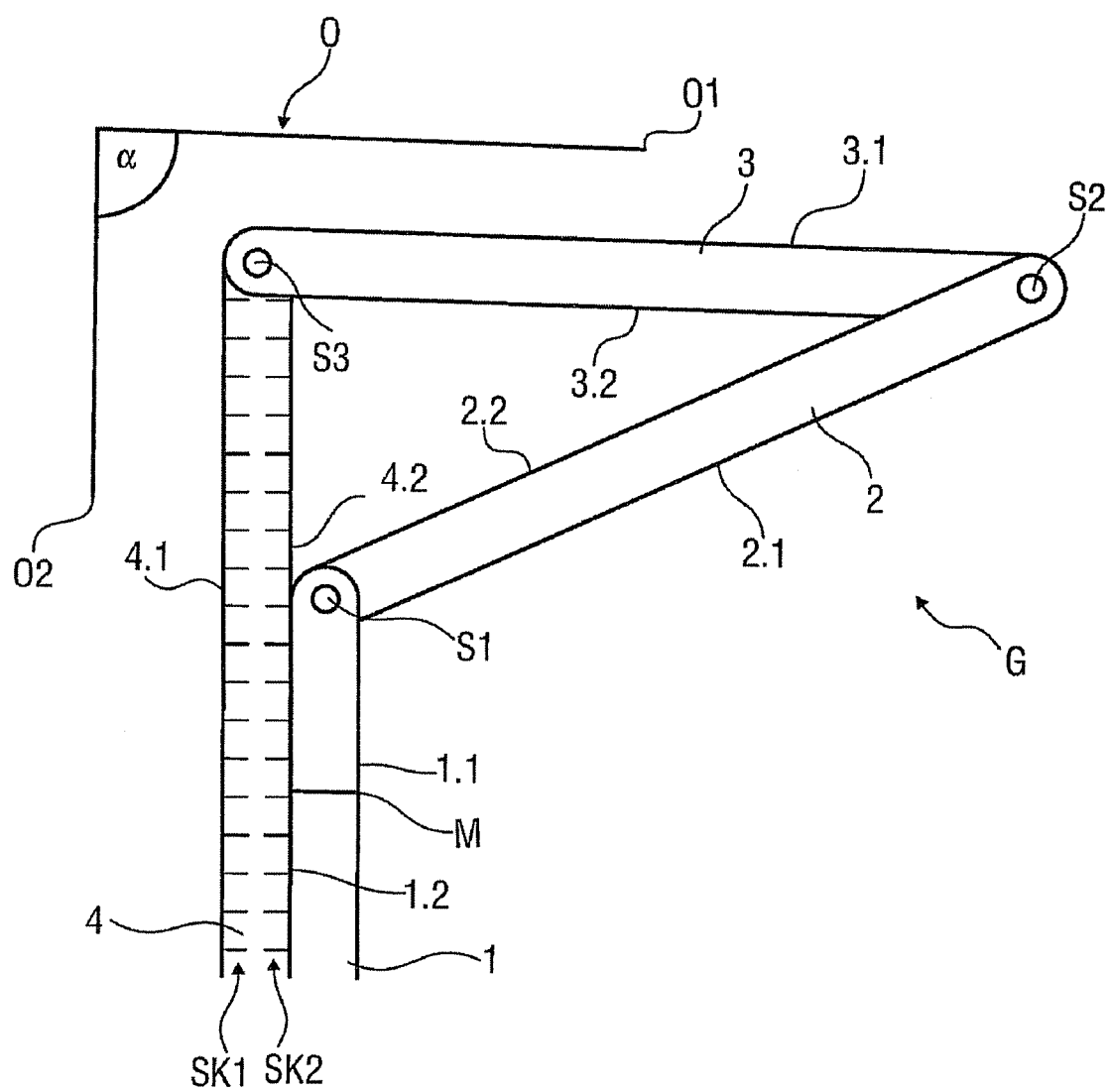
Figure 3:
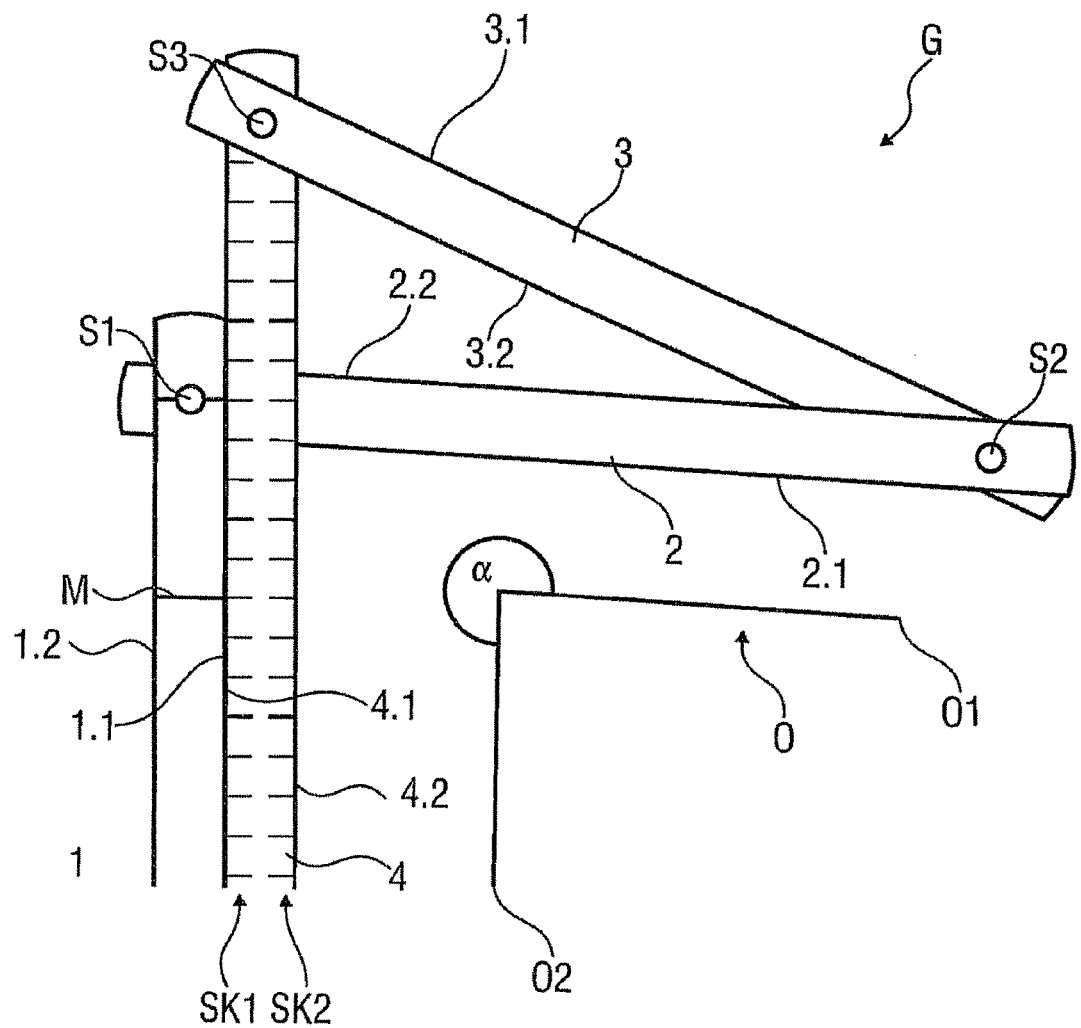
Figure 4:
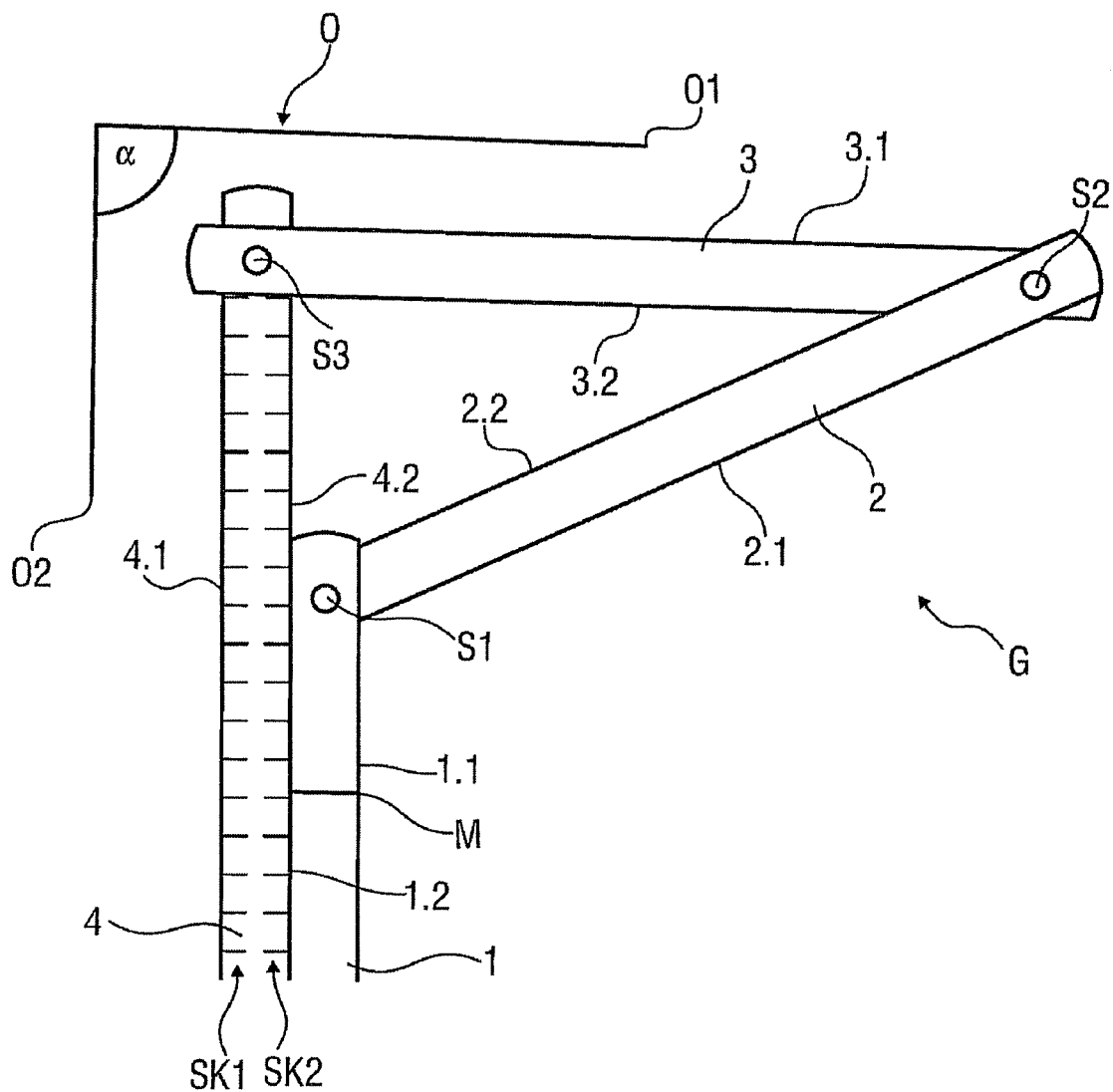

Exemplary embodiments of the invention are explained in more detail below by way of drawings, in which:

FIG. 1 shows a schematic representation of a first exemplary embodiment of a folding rule and of a first object with an angle to be measured, FIG. 2 shows a schematic representation of a first exemplary embodiment of a folding rule and of a further object with an angle to be measured, FIG. 3 shows a schematic representation of a second exemplary embodiment of a folding rule and of a first object with an angle to be measured, and FIG. 4 shows a schematic representation of a second exemplary embodiment of a folding rule and of a further object with an angle to be measured.

Parts that correspond to one another are provided with the same references in all the figures.

FIGS. 1 and 2 show in each case a first exemplified embodiment of a folding rule G, which can be used for measuring angles, in each case in both examples for measuring an angle α on an object O. In this case, a schematic representation of the object O is shown in each case in a very simplified manner as the respective angle α, is purely to explain the function of the folding rule G for measuring angles in a simple manner.

The folding rule G shown as an example in the figures, also designated as a folding ruler, includes at least four sections 1, 2, 3, 4 which are fastened to one another so as to be pivotable and in each case comprise a same length. Only said four sections 1, 2, 3, 4, which are necessary at least for the angle measuring explained in more detail below, are shown here for reasons of clarity. In an advantageous manner, in embodiments not shown here, the folding rule G comprises at least one other fifth section or in a preferred manner at least one other fifth and one other sixth section. The advantages obtained from this are explained in more detail below. The folding rule G can naturally include even more sections.

The sections 1, 2, 3, 4 of the folding rule G comprise in each case two oppositely situated lateral edges 1.1, 1.2, 2.1, 2.2, 3.1, 3.2, 4.1, 4.2. The pivotable fastening of the sections 1, 2, 3, 4 is in each case positioned in the region of the end faces of the sections 1, 2, 3, 4 and is realized as pivot axes S1, S2, S3, by means of which in each case two of the sections 1, 2, 3, 4 are connected together so as to be pivotable. Said pivot axes S1, S2, S3 are realized, for example, as rivets.

At least the fourth section 4, as shown here, comprises two scales SK1, SK2 for measuring angles and the first section 1 comprises a read marking M. In this case, as shown in FIG. 1, the first scale SK1 for measuring angles and the read marking M are arranged in such a manner on the respective section 4, 1 that the read marking M points to the value of the first scale SK1 which corresponds to the angle α to be measured between the sides O1, O2 which abut against the second section 2 or against the fourth section 4, more precisely abut against the first lateral edge 2.1, 4.1 of the second section 2 or of the fourth section 4, when the first section 1 and the fourth section 4 are aligned parallel to one another and, in the example shown in FIG. 1, the first lateral edge 1.1 of the first section 1 or, in an example that is not shown, the second lateral edge 1.2 of the first section 1 abuts against the first lateral edge 4.1 of the fourth section 4.

The second scale SK2 for measuring angles and the read marking M, as shown in FIG. 2, are arranged in such a manner on the respective section 4, 1 that that the read marking M points to the value of the second scale SK2 which corresponds to the angle α to be measured between the sides O1, O2 which abut against the third section 3 or against the fourth section 4, more precisely abut against the first lateral edge 3.1, 4.1 of the third section 3 or of the fourth section 4, when the first section 1 and the fourth section 4 are aligned parallel to one another and a second lateral edge 1.2 of the first section 1 abuts against a second lateral edge 4.2 of the fourth section 4.

In a method for measuring angles which is to be carried out by means of the folding rule G, in a first variant, as shown in FIG. 1, the first section 1 and the fourth section 4 of the folding rule G are aligned parallel to one another, wherein, as shown in FIG. 1, the first lateral edge 1.1 of the first section 1 or, in an embodiment not shown here, the second lateral edge 1.2 of the first section 1 is placed against the first lateral edge 4.1 of the fourth section 4, wherein the first lateral edge 2.1 of the second section 2 and the second lateral edge 4.2 of the fourth section 4 are placed in each case against a side O1, O2 of the angle α to be measured and wherein an angle value is read off at least the fourth section 4 at the position of the first scale SK1 for measuring angles, to which the read marking M on the first section 1 points. Said first variant of the method is suitable for measuring the angle α shown in FIG. 1. The folding rule G, which, for reasons of clarity, is shown still at a spacing from the object O in FIG. 1, is to be placed against the object O in the above-described manner for this purpose, i.e. against the outer sides of the object O which form the sides O1, O2 of the angle α to be measured.

As an alternative to this, as shown in FIG. 2, the first section 1 and the fourth section 4 of the folding rule G are aligned parallel to one another and are placed side by side with second lateral edges 1.2, 4.2, wherein first lateral edges 3.1, 4.1 of the third section 3 and of the fourth section 4 are each placed against a side O1, O2 of the angle α to be measured and wherein an angle value is read off at least on the fourth section 4 at the position of a second scale SK2 for measuring the angle to which the reading mark M on the first section 1 points. Said second variant of the method is suitable for measuring the angle α shown in FIG. 2. The folding rule G, which, for reasons of clarity, is shown still at a spacing from the object O in FIG. 2, is to be placed against the object O in the above-described manner for this purpose, i.e. against the inner sides of the object O which form the sides O1, O2 of the angle α to be measured.

The folding rule G and the method enable the measuring of angles α such that no additional measuring instrument, for example in the form of a separate protractor, is necessary for this type of angle measuring. This is advantageous, for example, for craftsmen as they usually have to have a folding rule G with them and, by means of the folding rule G that is realized in the manner described, they are able to carry out not only the usual length measurements but also additionally the angle measurements. Carrying a separate angle measuring device can be avoided in this manner.

The first variant of the method shown in FIG. 1 enables the measuring of reflex angles, also designated as over-obtuse angles. These types of reflex or over-obtuse angles in each case comprise an angle value greater than 180° and less than 360°. The angle α to be measured in FIG. 1 is realized as such a reflex or over-obtuse angle. For example, angles α of objects O can be measured in this way by placing the folding rule G in the described manner against the outer sides of the respective object O which are aligned at a corresponding angle with respect to one another, for example against the outer sides of outside walls of a building which adjoin one another. If the inner sides of the object O, for example of the building, are aligned parallel to the outer sides, the corresponding angle on the object O, which is possibly inaccessible to the folding rule G, is also able to be determined in this way. The value of said inside angle is calculated by forming the difference from 360° and from the angle value determined on the outside in the described manner.

The second variant of the method shown in FIG. 2 enables the measuring of acute angles, right angles and obtuse angles. The angle α to be measured in FIG. 2 is realized as such an acute angle which in this case is almost a right angle. For example, in this way, angles α of objects O can be measured by placing the folding rule G in the described manner against the inner sides of the respective object O which are aligned at a corresponding angle in relation to one another, for example against the inner sides of adjoining walls of a building. If the outer sides of the object O, for example of the building, are aligned parallel to the inner sides, it is also possible in this way to determine the corresponding angle on the outer sides of the object O which is possibly inaccessible to the folding rule G. The value of said outside angle is calculated by forming the difference from 360° and from the angle value determined on the inside in the described manner.

In both cases, the respective scale SK1, SK2, i.e. for the first variant the first scale SK1 and for the second variant the second scale SK2, can also comprise both angle values in an advantageous embodiment such that the difference is not formed but rather the measured angle value and the angle value resulting from forming the difference can be read directly off the respective scale SK1, SK2. As an alternative to this, the first scale SK1 and/or the second scale SK2 can also only comprise the angle value resulting from forming the difference such that said angle value does not have to be calculated but can be directly read off the respective scale SK1, SK2. In this case, the respective other angle value actually measured in the above-described manner would have to be calculated, where required, by a corresponding recalculation.

In one embodiment of the folding rule G, the folding rule G can also comprise, for example, just the first scale SK1 or just the second scale SK2. In said case, however, just the first variant or just the second variant of the method could then be carried out in a corresponding manner. Consequently, the embodiment in which the folding rule G comprises the two scales SK1, SK2 is clearly more advantageous as, in this way, there is a larger number of possible applications.

In an expedient manner, in embodiments that are not shown here, the two scales SK1, SK2 are continued onto at least a fifth section of the folding rule G, in a preferred manner also onto a sixth section of the folding rule G. In this way, angle measuring is enabled over a very large angle value range. If this is the case, the scales SK1, SK2 on said subsequent sections are also positioned in an expedient manner as on the fourth section 4. If the angle α to be measured should then comprise an angle value where it is not possible to place the first section 1 against the fourth section 4 of the folding rule G in the above-described method, in place of the fourth section 4, depending on the respective angle value of the angle α to be measured, either the fifth section or the sixth section of the folding rule G is used, wherein then if the fifth section is used in place of the fourth section 4, the fourth section 4 and the fifth section of the folding rule G are pivoted in such a manner that the fourth section 4 and the fifth section are aligned in a line one behind another, and if the sixth section is used in place of the fourth section 4, the fourth section 4 as well as fifth and sixth sections of the folding rule G are pivoted in such a manner that the fourth section 4, the fifth section and the sixth section are aligned in a line one behind another. I.e. the fifth section and, if present, the sixth section of the folding rule G in this way form an elongated fourth section of the folding rule G such that the method in both variants is able to be carried out in the above-described manner with the elongated fourth section in place of the fourth section 4.

The first scale SK1 is arranged in the region of the first lateral edge 4.1 of the fourth section 4 and the second scale SK2 is arranged in the region of the second lateral edge 4.2 of the fourth section 4. In this way, reading the respective angle value is made easier as the read marking M always abuts directly against the scale SK1, SK2 used in the respective method variant.

A spacing between a second pivot axis S2, by means of which the second section 2 and the third section 3 are fastened to one another so as to be pivotable, and an edge of the end face of the third section 3 nearest the second pivot axis S2 is no larger than the smallest spacing between the second pivot axis S2 and the first lateral edge 2.1 of the second section 2. In this way, it is ensured that in the first variant shown in FIG. 1, the placing of the first lateral edge 2.1 of the second section 2 against the first side O1 of the angle α to be measured is not obstructed by a protrusion of the third section 3 beyond the first lateral edge 2.1 of the second section 2.

A spacing between the second pivot axis S2 and an edge of the end face of the second section 2 nearest the second pivot axis S2 is no larger than the smallest spacing between the second pivot axis S2 and a first lateral edge 3.1 of the third section 3. In this way, it is ensured that in the second variant of the method shown in FIG. 2 the placing of the first lateral edge 3.1 of the third section 3 against the first side O1 of the angle α to be measured is not obstructed by a protrusion of the second section 2 beyond the first lateral edge 3.1 of the third section 3. Measuring errors are prevented in this manner.

Spacings between the third pivot axis S3, by means of which the third section 3 and the fourth section 4 are fastened to one another so as to be pivotable, and an edge of the end face of the third section 3 nearest the third pivot axis S3 and an edge of the end face of the fourth section 4 nearest the third pivot axis S3 are the same size as and no larger than the smallest value of the spacing between the third pivot axis S3 and the first lateral edge 3.1 of the third section 3 and the first lateral edge 4.1 of the fourth section 4. As a result, it is ensured that the placing of the first lateral edge 3.1, 4.1 of the third section 3 and of the fourth section 4 against the respective side O1, O2 of the angle □ to be measured is not obstructed by a protrusion of the fourth section 4 beyond the first lateral edge 3.1 of the third section 3 and not by a protrusion of the third section 3 beyond the first lateral edge 4.1 of the fourth section 4. Measuring errors are avoided in this manner.

The read marking M extends over an entire width of the first section 1. As a result, reliable reading of the respective scale SK1, SK2 and reliable assignment of the read marking M to a respective value on the respective scale SK1, SK2 are made possible, both in the first and in the second variant of the method.

The folding rule G is expediently realized from wood, plastics material and/or metal. This enables a sturdy, wear-resistant folding rule G to be produced in a simple, cost-efficient manner.

In an expedient manner, the folding rule G comprises at least one length measuring scale on its sections 1, 2, 3, 4. This enables the dual function of the folding rule G such that it can be used both for angle measuring and for length measuring. Said length measuring scale, in the example shown here, is arranged on a flat side of the folding rule G remote from the scales SK1, SK2 for measuring angles and is consequently not visible here. As a result of said arrangement of the length measuring scale, the two functions of the folding rule G are separated from one another such that a risk of confusion is avoided and simple, reliable reading of the respective length or angle value and, as a result, reliable length determining when measuring lengths and reliable angle determining when measuring angles are made possible.

In addition, as a result of using said folding rule G, there is no longer any need for an additional measuring device for measuring angles, for example a protractor. This applies in particular when the folding rule G additionally comprises the length measuring scale such that the generally known measuring tasks, namely in particular length measuring, can also be fulfilled using the folding rule G. As a result, cost expenditure, logistics expenditure and transport expenditure are reduced. For example, in this way craftsmen only have to have one measuring instrument with them instead of two different measuring instruments in order to carry out the necessary measuring tasks.

FIGS. 3 and 4 each show a second exemplary embodiment of a folding rule G which can be used for measuring angles, in the two examples for measuring an angle α in each case at an object O.

In contrast to the first exemplary embodiment shown in FIGS. 1 and 2, spacings between the second pivot axis S2 and the edge of the end face of the third section 3 nearest the second pivot axis S2 and the edge of the end face of the second section 2 nearest the second pivot axis S2 are greater than the smallest spacing between the second pivot axis S2 and the first lateral edge 2.1 of the second section 2 and the first lateral edge 3.1 of the third section 3. In addition, spacings between the third pivot axis S3 and the edge of the end face of the third section 3 nearest the third pivot axis S3 and the edge of the end face of the fourth section 4 nearest the third pivot axis S3 are greater than the smallest value of the spacing between the third pivot axis S3 and the first lateral edge 3.1 of the third section 3 and the first lateral edge 4.1 of the fourth section 4.

In order to avoid measuring errors in the case of said realization, an offset value is added to the value of the angle α to be measured read from the read marking.

LIST OF REFERENCES

1 First section
1.1 First lateral edge of the first section
1.2 Second lateral edge of the first section
2 Second section
2.1 First lateral edge of the second section
2.2 Second lateral edge of the second section
3 Third section
3.1 First lateral edge of the third section
3.2 Second lateral edge of the third section
Fourth section
4.1 First lateral edge of the fourth section
4.2 Second lateral edge of the fourth section
G Folding rule
M Read marking
O Object
O1 First side
O2 Second side
S1 First pivot axis
S2 Second pivot axis
S3 Third pivot axis
SK1 First scale
SK2 Second scale
αAngle

The invention claimed is:

1. A folding rule, including at least four sections which are fastened to one another so as to be pivotable, wherein at least the fourth section comprises two scales for measuring angles and the first section comprises at least one reading mark,
   wherein the first scale for measuring angles and the reading mark are arranged in such a manner on the respective section that the reading mark points to the value of the first scale which corresponds to the angle to be measured between the sides which abut against the second section or against the fourth section when the first section and the fourth section are aligned parallel to one another and a first lateral edge or a second lateral edge of the first section abuts against a first lateral edge of the fourth section, and in that the second scale for measuring angles and the reading mark are arranged in such a manner on the respective section that the reading mark points to the value of the second scale which corresponds to the angle to be measured between the sides which abut against the third section or against the fourth section when the first section and the fourth section are aligned parallel to one another and a second lateral edge of the first section abuts against a second lateral edge of the fourth section.

2. The folding rule as claimed in claim 1,
   wherein the two scales are continued at least onto a fifth section of the folding rule.

3. The folding rule as claimed in claim 1,
   wherein the first scale is arranged in the region of the first lateral edge of at least the fourth section and the second scale is arranged in the region of the second lateral edge of at least the fourth section.

4. The folding rule as claimed in claim 1,
   wherein a spacing between a second pivot axis, by means of which the second section and the third section are fastened to one another so as to be pivotable, and an edge of the end face of the third section nearest the second pivot axis is no larger than the smallest spacing between the second pivot axis and a first lateral edge of the second section and/or in that a spacing between the second pivot axis and an edge of the end face of the second section nearest the second pivot axis is no larger than the smallest spacing between the second pivot axis and a first lateral edge of the third section.

5. The folding rule as claimed in claim 1,
   wherein a spacing between a third pivot axis, by means of which the third section and the fourth section are fastened to one another so as to be pivotable, and an edge of the end face of the third section nearest the third pivot axis and an edge of the end face of the fourth section nearest the third pivot axis is the same size as and no larger than the smallest value of the spacing between the third pivot axis and a first lateral edge of the third section and a first lateral edge of the fourth section.

6. The folding rule as claimed in claim 1,
   wherein the at least one reading mark extends over an entire width of the first section.

7. The folding rule as claimed in claim 1,
   wherein at least one length measuring scale on the sections.

8. The folding rule as claimed in claim 7,
   wherein the length measuring scale is arranged on a flat side of the folding rule remote from the scales for measuring angles.

9. The method for measuring angles by means of a folding rule as claimed in claim 1,
   wherein a first section and a fourth section of the folding rule are aligned parallel to one another, wherein a first lateral edge or a second lateral edge of the first section is placed against a first lateral edge of the fourth section, wherein a first lateral edge of a second section and a second lateral edge of the fourth section are each placed against a side of the angle to be measured and wherein an angle value is read off at least on the fourth section at the position of a first scale for measuring angles to which a reading mark on the first section points, or wherein a first section and a fourth section of the folding rule are aligned parallel to one another and are placed side by side with second lateral edges, wherein first lateral edges of a third section and of the fourth section are each placed against a side of the angle to be measured and wherein an angle value is read off at least on the fourth section at the position of a second scale for measuring angles to which a reading mark on the first section points.

* * * * *